Oct. 24, 1967              T. RUT              3,348,407
DEVICE AND PARTICULARLY FORGING APPARATUS FOR
SIMULTANEOUS UPSETTING AND BENDING OF
MATERIAL LIKE BARS, RODS OR INGOTS
Filed Sept. 2, 1964              6 Sheets-Sheet 1

INVENTOR

TADEUSZ RUT

BY *Larson and Taylor*

ATTORNEYS

INVENTOR
TADEUSZ RUT

Oct. 24, 1967    T. RUT    3,348,407
DEVICE AND PARTICULARLY FORGING APPARATUS FOR
SIMULTANEOUS UPSETTING AND BENDING OF
MATERIAL LIKE BARS, RODS OR INGOTS
Filed Sept. 2, 1964    6 Sheets-Sheet 6

INVENTOR
TADEUSZ RUT

BY *Larson and Taylor*

ATTORNEYS

United States Patent Office 3,348,407
Patented Oct. 24, 1967

3,348,407
DEVICE AND PARTICULARLY FORGING APPARATUS FOR SIMULTANEOUS UPSETTING AND BENDING OF MATERIAL LIKE BARS, RODS OR INGOTS
Tadeusz Rut, Poznan, Poland, assignor to Centralne Laboratorium Obrobki Plastycznej, Poznan, Poland
Filed Sept. 2, 1964, Ser. No. 394,073
Claims priority, application Poland, Sept. 30, 1963, 102,676, 102,679
25 Claims. (Cl. 72—450)

The invention relates to a machine for upsetting of bars, rods or similar raw material provided with a set of tools for clamping the machined piece and upsetting the same owing to the relative approaching of the shifted members of this set and may also simultaneously bend the workpiece.

In known upsetting machines of this kind the approaching towards each other of the members of the upsetting die tools, after the bar has been clamped in them, is obtained by means of inclined guiding planes made in the head of the device fixed to the slider or head of the press. The main disadvantage of such machines is the high weight and the constant value of the transfer force ratio from the press on the upsetting die tools during the whole upsetting process, whereas, as is well known, the resistance produced by the part of the bar which is upset grows steadily during the upsetting operation and is the greatest at the end of the operation.

In order to eliminate this disadvantage it has been proposed to connect the head, fixed to the slider of the press with the top tool, by means of pivoting links which are inclined in relation to the tool axis at an angle smaller than 90° and greater than 0°. These links have been fixed to the top die tool by means of bearings, located in the parting plane of the die tools and have had shapes which required complicated and onerous processings. A further disadvantage of such a construction, when the links were placed in the parting plane of the die tools, was the necessity to make die tools with parting planes at different levels, whereby the die cavity ought to be smaller than the space between two coaxially mounted links. Such arrangements were very complicated and expensive.

The aim of the invention is to provide an apparatus which permits the use of wide die tools having very simple links.

A further object of this invention is to provide a device which eliminates the sliding guidance of the upsetting die tools, particularly of the bottom tool parts. This aim has been attained according to this invention owing to the providing of this device with articulated links, pivotally mounted on the upper set and at least on the bottom set of the die tools, beyond the parting surface of these die tools.

Furthermore it is very advantageous to have these articulated links as broad as the die tools, at best equal to them. Owing to such a construction a small load intensity on the bearings is obtained. It is advantageous to make the bearings of each articulated link of two rollers or roller segments, one of which is fastened to the head or to the pedestal of the machine whereas the second is fastened to the die. These rollers or roller segments are connected by means of link elements, owing to which the dies are connected and combined with the head or the pedestal of the apparatus. The connection of the links can be also otherwise made, e.g. by providing the dies, the head and the base of the machine with cylindrical grooves in which cylindrical working surfaces of the articulated links pivot.

The articulated links of the apparatus according to the invention can be provided on both sides with link elements connecting both bearings of each link.

It is particularly advantageous when each die tool of such a device is connected with the press by at least two parallely placed combined links.

The device according to the present invention can be additionally provided with tools serving for the bending of the treated object like bars, rods, etc. during the upsetting process. It is then possible, using such a device, to forge crankshafts.

The apparatus according to the invention can be mounted on a press as a supplementary device or can be an independent machine with its own drive. When the articulated links are suitably mounted the device according to the invention can be used also to disconnect elements clamped within the die tools.

In the accompanying drawings there are different exemplary embodiments of the device according to the present invention.

Figure 11:
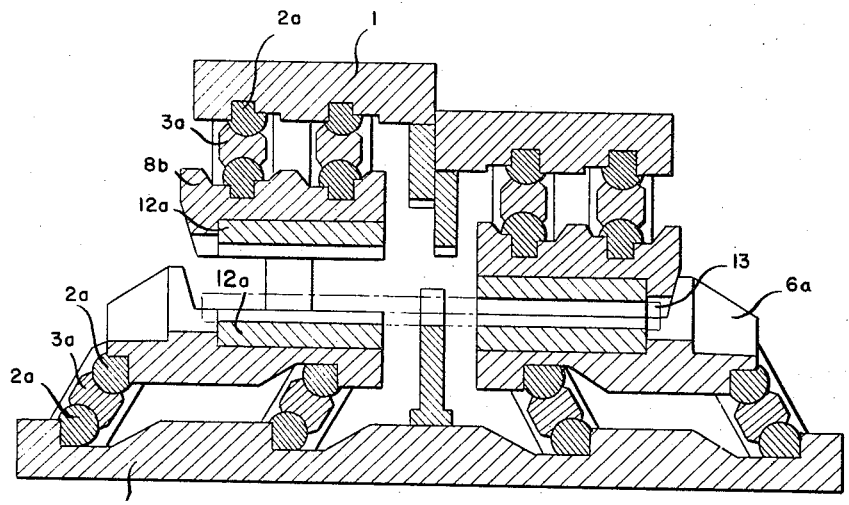

FIG. 11 presents another embodiment of the upsetting and simultaneously bending apparatus in a vertical longitudinal section, in which on the left side it is shown before the working stroke has taken place and on the right side when the die tools are in closed position.

Figure 12:
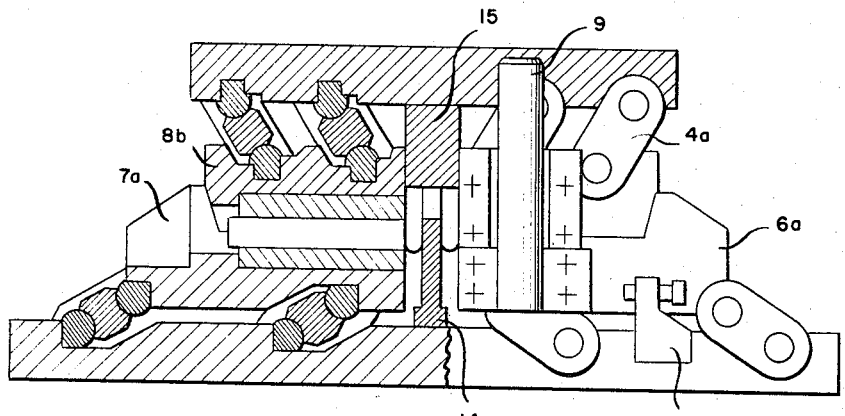

FIG. 12 is a side view, partially in section of this embodiment in a position at the end of the working stroke.

Figure 13:
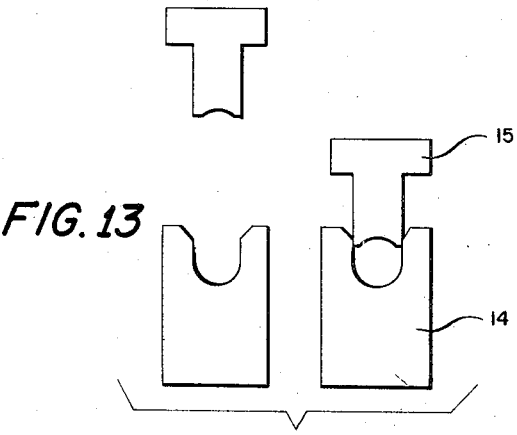

FIG. 13 is a diagrammatic view of the bending tools as employed in the embodiment according to FIGS. 11 and 12.

Figure 14:
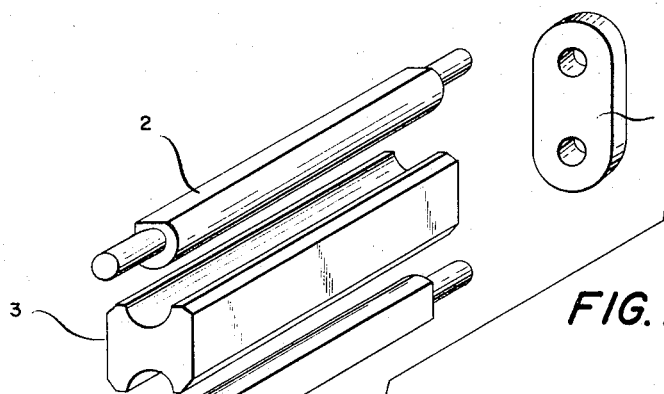

FIG. 14 represents an isometric view of the construction of an articulated link.

Figure 15:
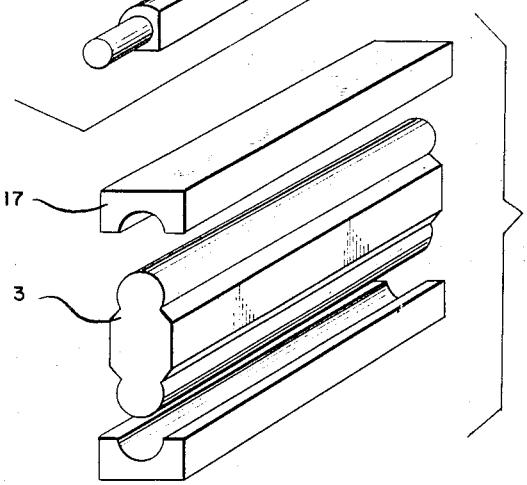

FIG. 15 is an isometric view of another embodiment of the device shown on FIG. 14.

The upsetting machine as represented in FIGS. 1–4 is composed of a top set and of a bottom set of die tools, in which the upper one is fixed to the head or slider of the press, and the lower one is placed on a bank or base of the machine pedestal. The upper set consists of a head 1 having attached thereto bearing rollers 2. Similar bearing rollers 2 are fixed to the top die on its upper surface, i.e. above the parting plane of the die set. Between these rollers there are placed articulated links 3. The rollers 2 are connected together by means of linking elements 4. The bottom set consists of a base 5 on which the bottom die tools 6 and 7 are slidably mounted. The base 5 is fixed on the table of the press 16.

The upper or top die tools 8 are provided with a protrusion 8a which enters into a suitable recess made in the bottom die tool 7 and acts as a dog. The upper die tools can be also guided in relation to the bottom ones by means of sliding columns 9.

The apparatus shown on FIGS. 1–4 acts as follows. During the working strokes of the press, its slider presses by means of the articulated links 3 on the die 8. causing it to press against the die 7. When the dies are approaching each other there occurs a clamping of the treated bar or workpiece 13 within the knurled fastening jaws 12 which are placed inside the cavities of the dies. By further pressing of the press a sliding motion of the dies 7 and 8 on the slideways of the base 5 occurs and produces an upsetting of the bar 13. During the idle motion of the press slider or after the work stroke has been performed, owing to the action of the pneumatic cylinder 10 supplied with compressed air, a mutual and opposite sliding away of the bottom die tools 6 and 7 towards their initial position occurs until stopped by the buffers 11.

Figure 5:
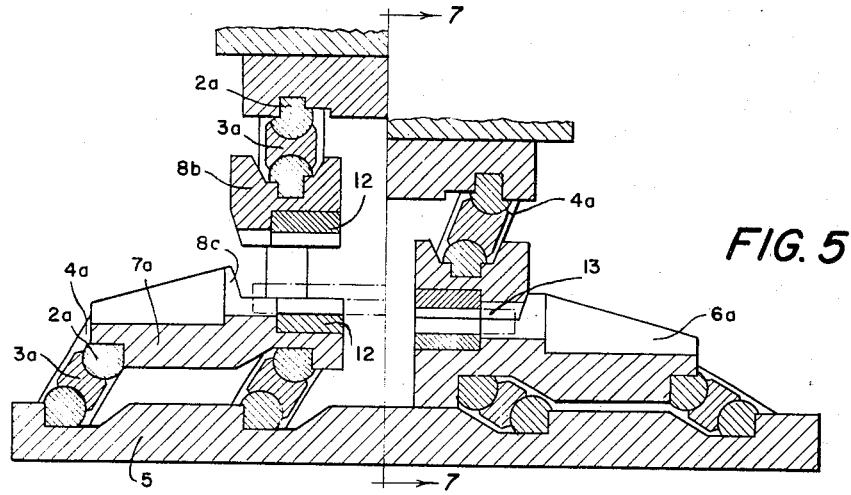
FIG. 5 is another embodiment of the upsetting apparatus in vertical longitudinal section, on the left side of which there is shown the position of the tools before the working stroke and, on the right side there is shown the position just when the tools are touching each other.
Figure 6:
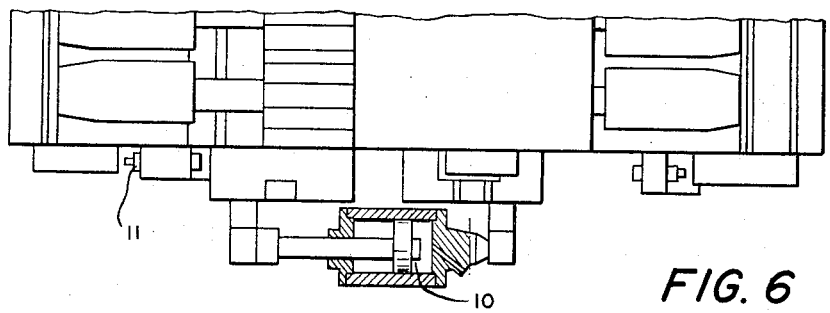
FIG. 6 shows a plan view of this device.
Figure 7:
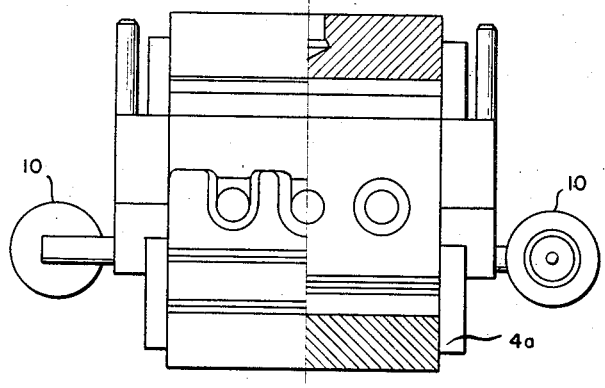
FIG. 7 is a section taken along the line 7—7 on FIG. 5.

In the upsetting devices as presented in FIGS. 5, 6 and 7 the bottom die tools 6a and 7a, as well as the upper die tool 8b are fixed to the press by means of articulated links 3a and rollers 2a, whereby, as can easily be seen from the drawing, the dies can be fastened to the press by means of one or two articulated links. It is obvious, that one die can also be fixed to the press by means of more than two articulated links. A projection 8c causes movement of die 7a by die 8b.

Figure 1:
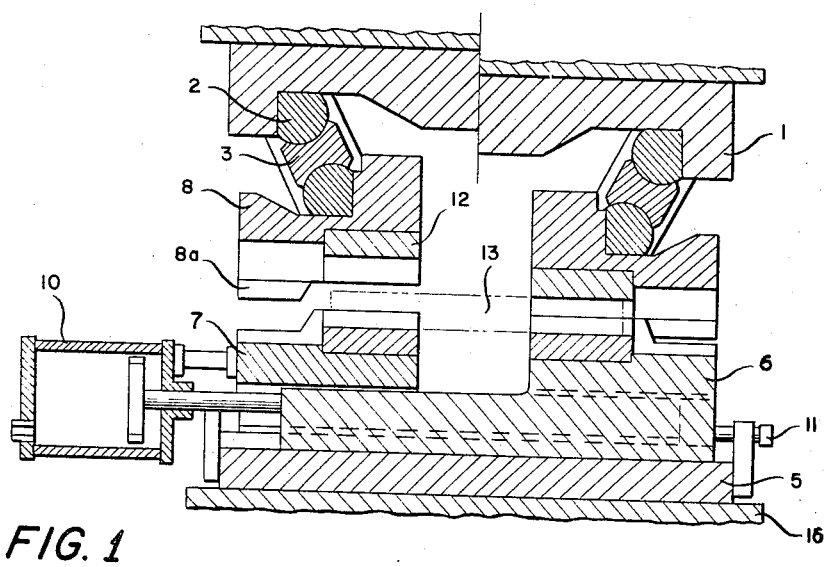
FIG. 1 shows the device or forging machine for upsetting in longitudinal section, in which the left side of this figure illustrates the position before the working stroke has taken place and the right side the position of the tools just when meeting each other.
Figure 2:
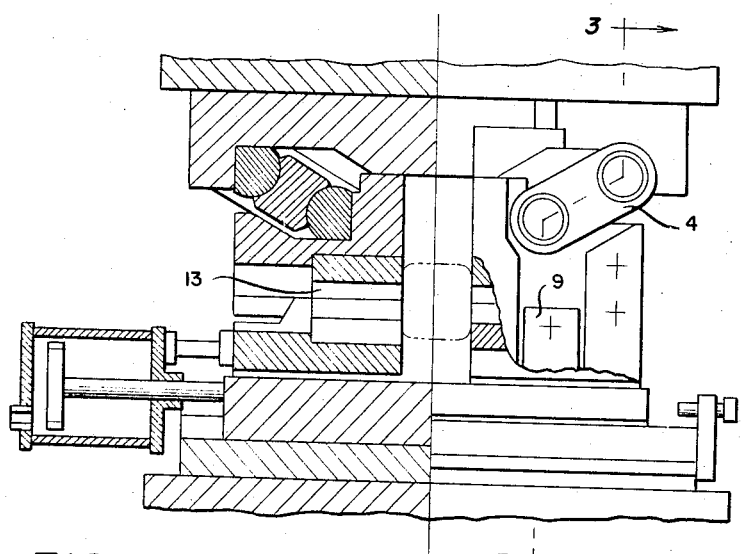
FIG. 2 shows the same device in side view, partially in section in its position at the end of the working stroke.
Figure 3:
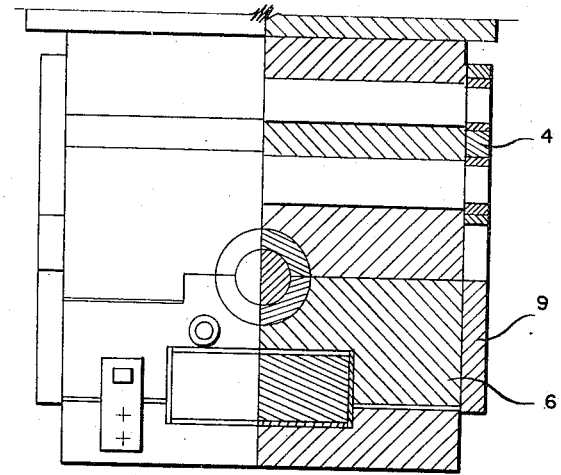
FIG. 3 shows this device from the front, partially in section along the planes according to the line 3—3 on FIG. 2.
Figure 4:
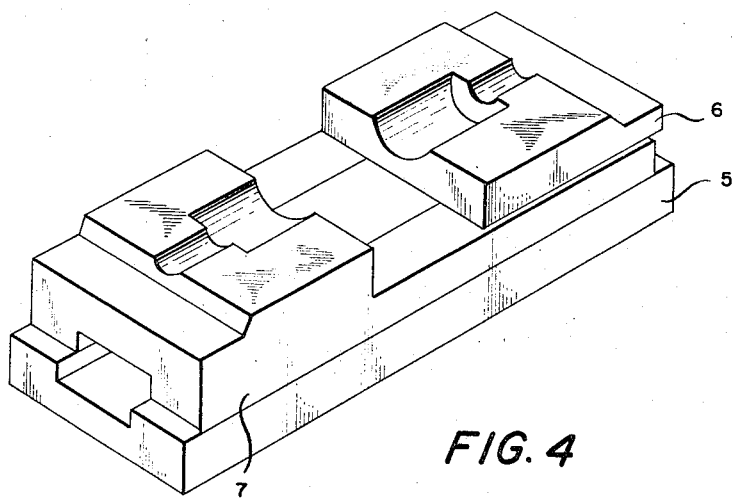
FIG. 4 shows a set of bottom die tools in an isometric view.
Figure 8:
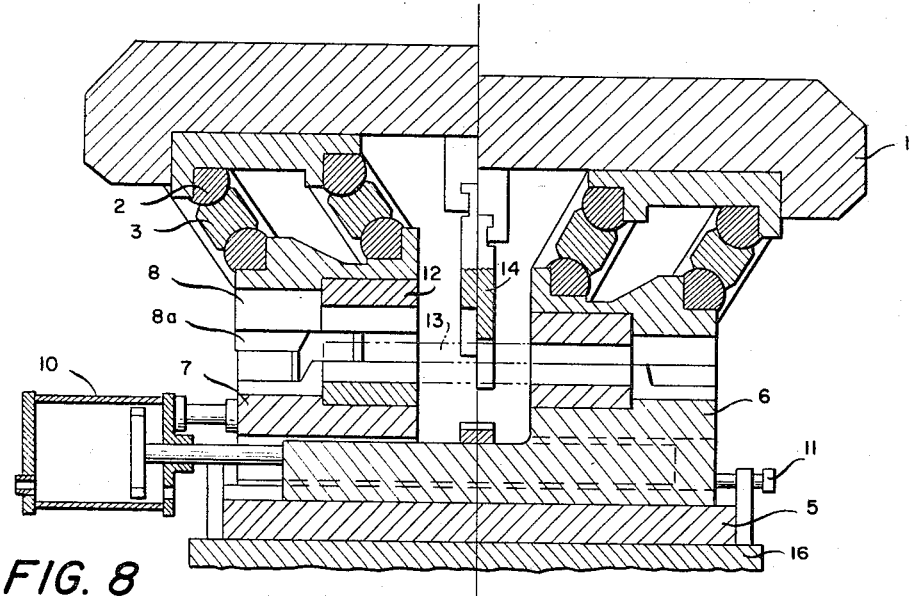
FIG. 8 is a vertical longitudinal section of an upsetting and simultaneously bending device in which the left side illustrates the position of the same before the working stroke has taken place and the right side shows its position just when the dies are touching each other.
Figure 9:
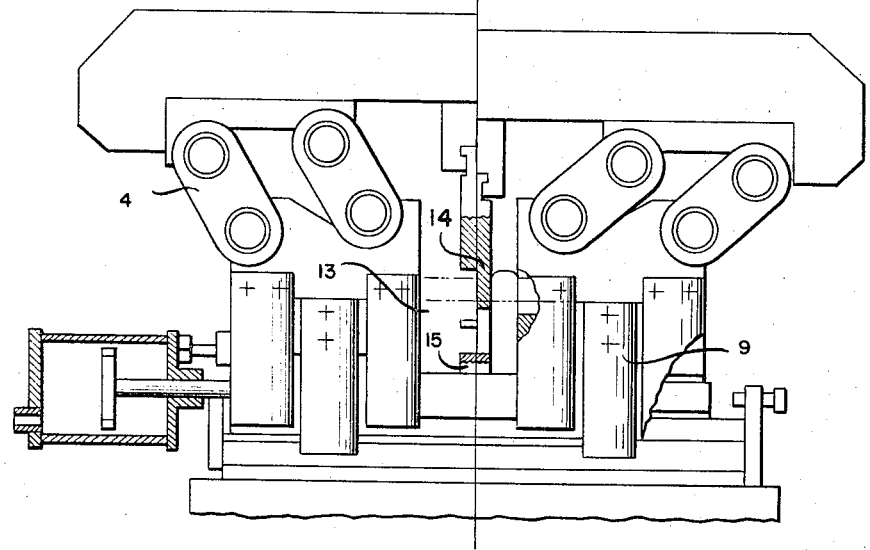
FIG. 9 is a side view, partly in section, of the apparatus, in which at the right side there is shown the position at the end of the working stroke.
Figure 10:
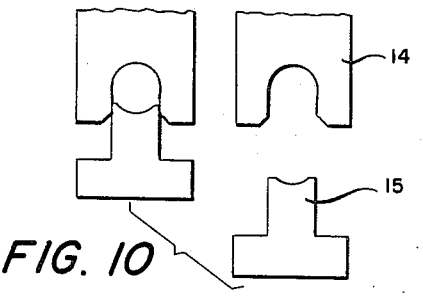
FIG. 10 is a diagrammatic view of the bending tools used with the apparatus of FIGS. 8 and 9.

An upsetting device, which can simultaneously bend the bar material is shown on FIGS. 8, 9 and another is shown in FIGS. 11 and 12, these being similar constructions to the devices shown in FIGS. 1, 2 and in FIGS. 5, 6, respectively with the difference that to the base 5 and to the head 1, bending tools are fixed, namely the bending die 14 and the anvil 15.

These tools bend the bar 13 simultaneously with the upsetting and in combination with the fastening jaws 12 shape the throw of the produced crankshaft; as shown each of the top dies 8 is fastened to the head 1 by means of two links.

In FIGS. 5–12 numerals designating parts corresponding to but different from parts in FIGS. 1–4 are identified by corresponding numerals with subscripts.

The articulated links of this apparatus are journaled across the whole width of the dies. Owing to the high efficiency of this device it is possible to make use of very broad dies, having cavities placed closely side by side, which permits either the forging of several elements at the same time or the forging of the same element successively in the suitable cavities of the die, or the forging of a series of elements in a continuous method of forging, i.e. at each working stroke as many elements are treated as there are cavities in the dies, whereby after each working stroke each element is shifted to the next cavity of the die.

As shown on FIG. 14 the bearing rollers 2 having cylindrical segments are placed in suitable cylindrical grooves made in the base 5, the head 1 as well as in the die tools 6, 7 and 8 of the device, which grooves are transversally placed in relation to the direction of motion of these dies during the upsetting process. Between the rollers placed in the dies and the same located in the head or base there are proper links 3 placed provided with concave cylindrical grooves in which the rollers 2 are located. Two rollers belonging to one articulated link are held together at their both ends by means of linking elements 4.

In an other embodiment of this construction as shown on FIG. 15 there are links 3 used which are provided with convex cylindrical surfaces, whreby the cylindrical surfaces of these links are located in inserts 17 with cylindrical grooves for the cylindrical surfaces of said links 3.

What I claim is:

1. Forging apparatus comprising a press base and a press head movable towards and away from said base, first means carried by said press head and base for engaging a workpiece between them upon movement of said head towards said base, second means carried by said press head and base for engaging the said workpiece between them upon movement of said head towards said base, said second means being spaced from said first means transversely of the path of movement of said head, and means connecting said first means to said head and said base for causing said first means to move towards said second means during movement of said head towards said base.

2. The apparatus of claim 1, said first means comprising a pair of opposed die members.

3. The apparatus of claim 2, said connecting means comprising articulated link means pivotally connected to a said die member and to said head about parallel axes, said axes lying transversely of the path of movement of said press head.

4. The apparatus of claim 3, said connecting means further comprising means for guiding a said die member for movement on said base along a path extending towards said second means.

5. The apparatus of claim 4, said guiding means comprising slide guide means.

6. The apparatus of claim 4, said guiding means comprising articulated link means pivotally connected to the other of said die members and to said base about axes parallel to the axes of said first mentioned link means.

7. The apparatus of claim 6, said axes of said last mentioned link means lying in spaced relation away from said base.

8. The apparatus of claim 4, said opposed die members comprising said first means comprising engaging means for effecting movement of said die member on said base from said die member on said head.

9. The apparatus of claim 3, said axes lying in spaced relation along the path of movement of said head, said axis closer to said base being that axis about which said link pivots relative to said die member and being between the parting surface of said opposed die members and said head.

10. The apparatus of claim 3, said link means having an extent along their pivotal axes substantially equal to the width of the die member pivotally connected thereto.

11. The apparatus of claim 3, said link means each comprising a bearing member engaging said head, a second bearing member engaging a said die member, and a link in engagement with said bearing members along mating cylindrical engaging surfaces.

12. The apparatus of claim 11, in which said bearing members have convex engaging surfaces.

13. The apparatus of claim 11, in which said bearing members have concave engaging surfaces.

14. The apparatus of claim 11, and link elements pivotally connecting said bearing members together.

15. The apparatus of claim 1, and means for moving the portions of said first means carried by said base away from the portion of said second means carried by said base.

16. The apparatus of claim 1, and means connecting said second means to said head and said base for causing said second means to move towards said first means during movement of said head towards said base.

17. The apparatus of claim 1, and means carried by said head between said first and second engaging means for exerting a force on the workpiece between said engaging means.

18. The apparatus of claim 17, wherein said last mentioned means comprises a bending die, and an anvil carried by said base in opposed cooperative relationship to said bending die.

19. Forging apparatus comprising a base, a head movable towards and away from said base, a pair of opposed die members carried respectively by and between said head and base, an articulated link pivotally connecting a first said die member to said head about axes extending transversely of the direction of movement of said head, whereby said link may have a component of motion transverse of said axes and the path of movement of said head, means mounting a second said die member for movement transversely of the path of movement of said head and transversely of said axes, and means for engaging a workpiece engaged by said die members at a point spaced from said die members.

20. Forging apparatus comprising a press base and a press head, a pair of upper die members and a pair of lower die members in opposing relation, articulated link means pivotally connecting said upper die members to said press head about axes transverse to the path of movement of said press head for imparting to said upper die members movement towards each other upon a resistance to the downward movement of said upper die members with said press head, and means for guiding said lower die members in a path of movement towards each other on said base, whereby a workpiece may be engaged by said upper and lower die members and upset thereby upon movement of said press head towards said base.

21. The apparatus of claim 20, and means carried by said press head for engaging and bending a workpiece held by said dies.

22. The apparatus of claim 20, said last mentioned means comprising a slide guide.

23. The apparatus of claim 20, said last mentioned means comprising articulated link means.

24. The apparatus of claim 20, wherein said link means are pivotally connected to said upper die members above the parting plane thereof.

25. The apparatus of claim 20, and means on said upper and lower die members for imparting movement to said lower die members from said upper die members.

References Cited
UNITED STATES PATENTS

| | | | |
|---|---|---|---|
| 565,257 | 8/1896 | Boyd | 72—402 |
| 585,997 | 7/1897 | Zeller | 72—402 |
| 1,039,887 | 10/1912 | Bauroth | 72—353 |
| 1,473,478 | 11/1923 | Humphris | 72—351 |
| 1,591,389 | 7/1926 | Leighton | 72—357 |
| 3,194,048 | 7/1965 | Byam. | |

HARRISON L. HINSON, *Primary Examiner.*